May 30, 1933.  J. R. McFARLIN  1,911,380
MOUNTING BRACKET
Filed July 18, 1929   2 Sheets-Sheet 1

Inventor
JOHN R. McFARLIN
By Lew Edelson
Attorney.

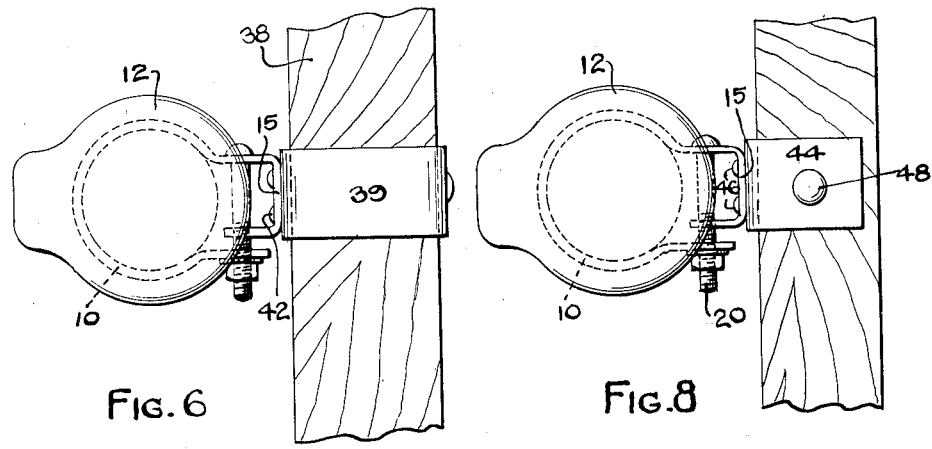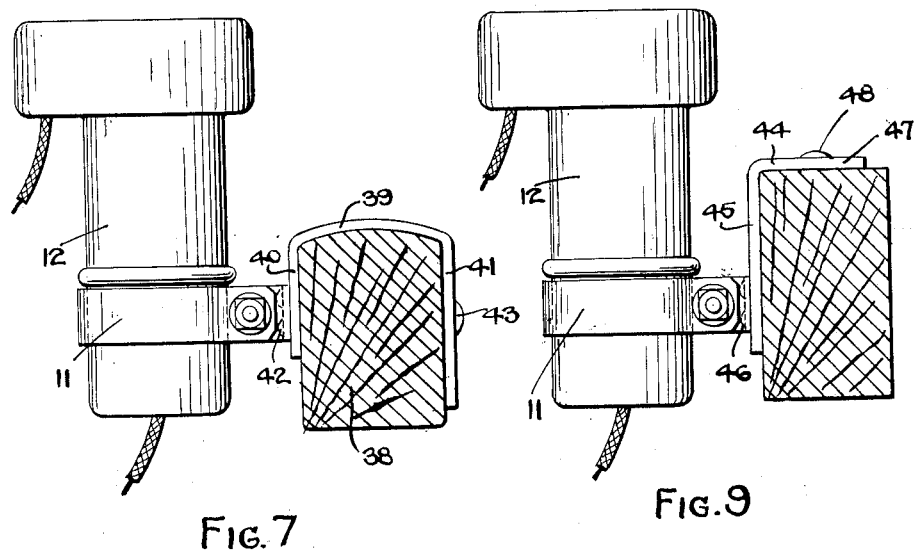

Patented May 30, 1933

1,911,380

UNITED STATES PATENT OFFICE

JOHN R. McFARLIN, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA

MOUNTING BRACKET

Application filed July 18, 1929. Serial No. 379,135.

This invention relates to mounting brackets and more particularly to improvements therein for rendering the same more readily adaptable for supporting lightning arresters, insulators and various other bodies upon a fixed support.

Among the objects of the present invention is the provision of a mounting bracket which is not only exceedingly simple in construction and inexpensive to manufacture but is also of such character that it requires a minimum expenditure of time and labor, both in its application to the support therefor and in mounting therein the body to be supported.

A further object of the present invention is to provide a single strap clamping member within which a lightning arrester, insulator or other body to be supported may be quickly, effectively and securely mounted without the use of any special tools, the said clamp being characterized by the provision of an inflexible two-point support for the shank of a clamping bolt the free end of which projects through a free-floating lip forming part of the clamp, said two-point support serving as a most effective and efficient means for preventing lateral twisting of the clamp strap with respect to its supporting saddle.

A still further object of the invention is the provision of a clamping member in the form of a strap, one end of said strap having operatively associated therewith a pair of spaced substantially inflexible branches having aligned openings through which a bolt is adapted to be projected while the opposite end thereof is freely movable with respect to said spaced branches and apertured to permit the projection therethrough of the nut end of said bolt, said free end of the strap being spring pressed outwardly and away from the opposed inflexible branches whereby to serve as an effective locking means for the bolt nut at the same time that it facilitates the ready removal of the supported body from the clamping member when said nut is totally removed or partially withdrawn.

Still another object of the invention is the provision of a clamping member in the form of a strap having a free-floating lip, said member being characterized in that it includes means in the portion opposed to said lip for maintaining a clamping bolt immovable with respect to said lip during the operation of clamping said strap about the body of a unit to be supported with the result that the bolt becomes operative to prevent shifting of said lip laterally of the plane of the body of the clamping member.

Other objects of the invention and advantages relating thereto will be apparent more fully hereinafter.

The invention consists substantially in the combination, construction, location and relative arrangement of parts all as will appear more fully hereinafter, as shown in the accompanying drawings and as finally pointed out in the appended claims. While the present invention has been illustrated as a mounting for a lightning arrester or insulator, it will be readily understood that it is equally applicable for use in supporting various units and devices other than those herein disclosed. In the accompanying drawings:

Figure 2:
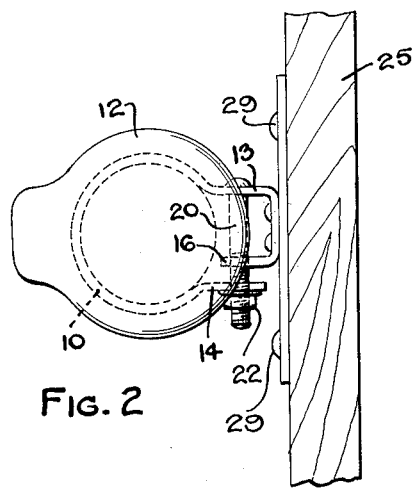
Figures 2 and 3 are top plan and side elevational views, respectively, showing the manner of using the bracket of Fig. 1.

Figures 6 and 7 are top plan and side elevational views, respectively, showing a still different arrangement for securing the mounting bracket upon a fixed support therefor; and Figures 8 and 9 are top plan and side elevational views, respectively, showing still further modified means for securing the bracket upon a support, it being observed that in all of the several modifications shown in the drawings the clamping member per se of the bracket is the same.

Figure 3:
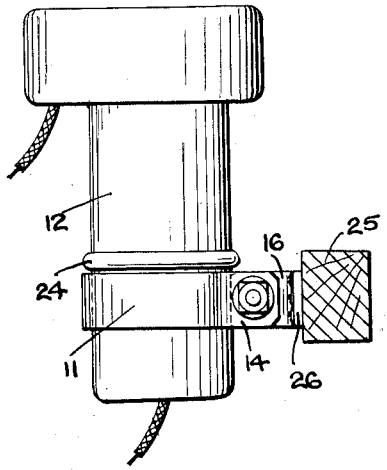
Figure 1:
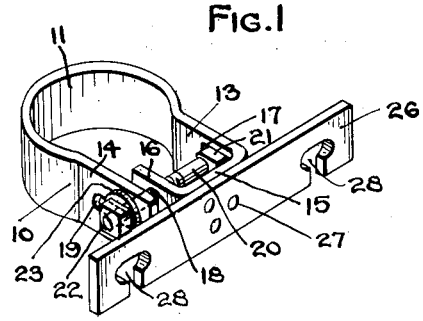
Figure 1 is a perspective view of a mounting bracket constructed in accordance with the principles of the present invention.

Referring now to the drawings, and more particularly to Figures 1 to 3 thereof, it will be observed that the mounting bracket constructed in accordance with the present invention comprises a metal strap 10 having a body portion 11 which is shaped to conform generally to the shape of the unit or device to be supported. In the drawings, this unit is illustrated as being in the form of a lightning arrester 12, the body of which is of substantially cylindrical form. The body 11 of the clamping member 10 is accordingly curved into generally circular shape, it being understood, however, that said strap body may be formed into various shapes other than that herein disclosed depending upon the shape or configuration of the unit to be supported.

As appears most clearly in Figures 1 and 2, the opposite ends of the curved portion 11 of the clamping member are provided with lateral extensions 13 and 14, the extension 13 being provided with an inturned branch 15 terminating in a flange 16 paralleling the extension 13. The extension 13 and the flange 16 are substantially inflexible and are maintained in the spaced parallel relation shown by the intermediate branch 15. The extension 14, the free outer edge of which terminates short of the plane of said branch 15, is relatively movable with respect to the substantially inflexible portions 13 and 16 of the clamp member, it being observed that the portion 16 is disposed intermediate the extension 13 and the relatively movable extension or lip 14. The material from which the clamping member 10 is fashioned is preferably inherently resilient, the freely movable extension or lip 14 being thus normally spring pressed outwardly and away from the relatively stationary intermediate flange 16.

Provided in the lateral extension 13 is a non-circular opening 17, preferably a square opening, the central axis of which is in alignment with that of a smaller circular opening 18 formed in the intermediate flange 16 of the strap. Provided in the free-floating lip 14 of the clamp member is an elongated slot or opening 19, this slot being so arranged that it is in constant registry with the aligned openings 17 and 18 during a limited movement thereof toward and away from the intermediate flange 16. Adapted to be projected through the aligned openings 17, 18 and 19 is a clamping bolt 20, the head of which is provided with a non-circular portion 21 adapted for reception within the correspondingly shaped opening 17. The shank of this bolt 20 projects freely through the opening 18 and the elongated slot 19, the outer end thereof being threaded for reception of a nut 22. This nut is adapted to bear against the outer face of the free-floating lip 14 of the clamping strap 10. If desired, a washer 23 may be interposed between said outer face and the nut 22. It will be understood that when the nut 22 is totally removed or partially withdrawn from its threaded bolt, the lip 14 as well as the body portion 11 of the strap will, of their own resiliency, move outwardly and away from the intermediate flange 16 of the clamping member, thereby permitting the ready insertion of the lightning arrester 12 within the curved portion 11 of said member. The nut 22 is then tightened upon the bolt 20, thereby forcing the spring pressed lip 14 toward the intermediate flange 16, with the result that the lighting arrester body is firmly clamped within the curved portion 11 of the strap 10. Inasmuch as the inward movement of the nut upon said bolt is resisted by the tendency of the free-floating lip 14 to move outwardly, said lip constitutes a most effective means for locking the nut against accidental or unintentional displacement.

It will also be observed that the bolt 20 is positively held against rotation during the operation of tightening up the nut and that the intermediate flange 16 constitutes an effective means for maintaining the bolt in a relatively stationary position during said tightening operation. The spaced parallel portions 13 and 16 of the clamping member, due to their inflexible nature, serve to effectually preclude any tendency for the bolt to shift out of the position shown in the drawings and into engagement with the surface of the body to be supported within the clamping member. In other words, the bolt 20 is at all times maintained in parallel relation with respect to the branch 15 of the clamping strap. Not only does the intermediate flange 16 of the strap serve to maintain the bolt in proper position and alignment but it also constitutes a rigid support for the outer threaded end thereof as well as a stop or abutment for the lip 14 of the clamp. The bolt 20, being thus supported in the plane of the strap body, thereby prevents any possibility of the free-floating lip 14 from shifting laterally of said plane. In order to prevent the lightning arrester 12 or other such body from moving axially with respect to the clamping member, it may be desirable to provide the body thereof with an annular groove within which the strap is received or with an annular shoulder 24, the bottom edge of which is adapted to rest upon the upper edge of the clamping member 10.

For mounting the clamping member upon the flat surface of a cross arm 25 or other such fixed support, the clamping member is provided with a strap or saddle 26 which is secured flatwise against the inturned branch 15 by means of rivets 27. If desired, spot welds may be substituted for or used in conjunction with said rivets. As appears most clearly in Figures 1 and 2, the saddle 26 projects to either side of the clamping member and is provided with a pair of laterally spaced slots 28 of such character as to permit the saddle to be slipped over or hooked upon suitable elements, such as headed bolts 29, carried by the supporting structure 25.

Figures 4 to 9, inclusive, show modified forms of means for securing the clamping member upon various types of supporting structures, it being understood that in each of these modified arangements the clamping member per se is substantially similar in construction to that hereinbefore described and shown most clearly in Figure 1. Accordingly the description of the clamping member will not be repeated herein, the following description being confined solely to various alternative means for supporting said clamping member in position.

Figure 4:
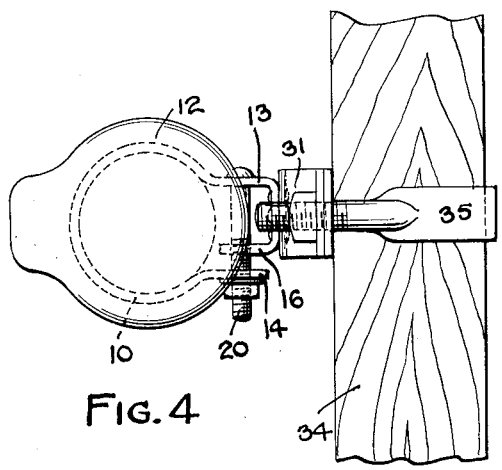
Figures 4 and 5 are top plan and side elevational views, respectively, of a mounting bracket embodying the principles of the present invention but employing modified means for securing the same upon a relatively fixed support.
Figure 5:
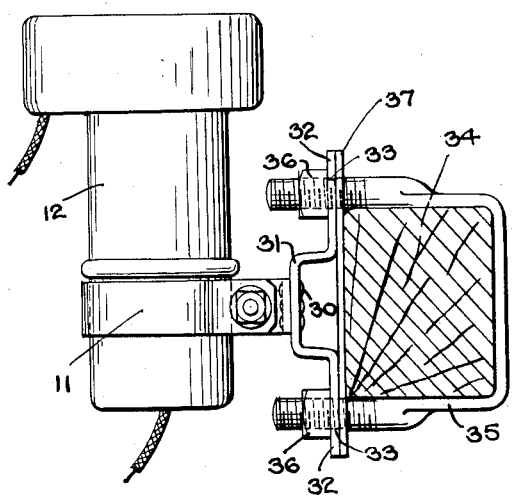

Referring now more particularly to Figures 4 and 5, it will be observed that the clamping member 10 has secured to the branch 15 thereof, preferably by means of rivets 30, a substantially U-shaped saddle 31 provided with oppositely extending flanges 32, said extensions being each apertured, as at 33. In the arrangement herein shown, the mounting bracket is adapted to be supported upon a cross arm 34, the effective depth of which is approximately equal to the distance between the apertures 33 of the saddle member 31. A U-bolt 35 is employed for securing said saddle member against the vertical face of the cross arm 34, the legs of this U-bolt being respectively projected through the openings 33 of the member 31 and threaded to receive the nuts 36. In order to prevent any possibility of flexing the member 31 when the nuts 36 are tightened upon the U-bolt legs, a rigid strap 37 may be interposed between the opposed faces of the member 31 and the cross arm 34.

Figures 6 and 7 show a still different arrangement for supporting the clamping member 10 in position upon a cross arm 38. In the arrangement shown in these figures, the clamping member 10 has secured to the branch 15 thereof a substantially channel shaped member 39, the branches 40 and 41 of which are adapted to closely embrace the sides of the cross arm. As in the former instances, rivets 42 are preferably employed for joining the branch 40 of the saddle 39 to the clamping member 10. In order to prevent accidental displacement of the saddle member from its supporting cross arm 38, the rear branch 41 thereof is apertured to permit the projection of a securing element, such as a screw or bolt 43, through said branch and into the cross arm.

Figures 8 and 9 show the use of an angle shaped supporting saddle 44 in place of the channel shaped saddle just described. The branch 45 of this angle shaped saddle is secured to the branch 15 of the clamping member, preferably by the rivets 46, while the branch 47 of said saddle member is suitably apertured to permit the insertion therethrough of an anchoring element 48. It will be observed that in each of the described arrangements the clamping member is supported in position with the axis thereof projecting vertically. It will be understood, however, that the clamping member may be supported in various positions other than that shown in the drawings.

It will be understood, of course, that the intermediate branch 16 need not necessarily be formed as an integral extension of the inturned branch 15 of the clamp, but, instead, may be in the form of a separate element secured to the saddle by which the clamp is supported, it being observed, however, that the element so formed parallels the rigidly mounted extension 13 of the clamp. In still other instances, it may be preferable to form the branch 16 as an integral extension of the clamp supporting saddle. In addition to the foregoing the invention contemplates disposing the branch 16, whenever it may be desirable to do so, such that it lies outwardly of and in substantial parallelism with the substantially inflexible extension 13, the latter being then positioned intermediate the branch 16 and the movable lip 14.

It will thus be understood that various changes in and modifications of the invention may be made from time to time without departing from the real spirit or principles thereof, and it is accordingly intended to claim the same broadly, as well as specifically, as indicated by the appended claims.

What is claimed as new and useful is:

1. In a mounting bracket of the character described, in combination, a clamping strap having a pair of laterally spaced end-sections, one section being provided with an inturned branch terminating in a flange immovably spaced from and paralleling said section, a supporting saddle for said strap secured to said inturned branch, and a bolt adapted to be projected through said end-sections and said flange for clamping said strap about a body to be supported, said flange constituting a fixed, intermediate support for maintaining the shank of said bolt in substantial parallelism with said inturned branch.

2. In a mounting bracket of the character described, in combination, a clamping strap having a pair of laterally spaced end-sections, one of said sections being provided with a substantially flat and inflexible inturned branch, said branch being adapted for securement flat-wise against a support for said bracket, a bolt adapted to be projected through said end-sections for clamping said strap about a body to be supported, and means integral with said inturned branch constituting a rigid support intermediately of said end-sections for maintainng the shank of said bolt in substantial parallelism with said inturned branch.

3. In a mounting bracket of the character described, a one-piece clamping strap one extremity of which is reversely bent to provide a pair of spaced inflexible branches and the other extremity of which is freely disposed in parallel relation to said branches and arranged for movement in a plane common to said branches, said inflexible branches being maintained in fixed spaced relation by an intermediate branch adapted to be secured flatwise to a support for the bracket, a bolt projected through aligned openings in said inflexible branches and freely disposed extremity, and a nut arranged for threaded engagement with said bolt for urging said freely disposed extremity toward said inflexible branches, said bolt being maintained in relatively stationary position by said branches during the operation of tightening said bolt.

4. In a mounting bracket of the character described, a clamping member in the form of an integral strap having a pair of relatively movable laterally spaced end-sections, one section being provided with a right angled extension having an inturned branch paralleling said section and constituting therewith a two-point support for a bolt, a bolt commonly projected through said extensions and said inturned branch, and means threadedly engageable with said bolt for urging the other of said end-sections toward said inturned branch whereby to clamp the body of said strap about a unit to be supported, the other branch of said extension being disposed in a plane paralleling the bolt and being adapted for securement flat-wise against a support for the bracket.

5. In a mounting bracket of the character described, in combination, an integral clamping strap having a pair of relatively movable extensions, one of said extensions being in the form of a channel the mouth of which presents toward the body of said strap and the side walls of which provide a pair of spaced inflexible branches for supporting a bolt, the other of said extensions being disposed in substantial parallel relation to said channel side walls, a bolt commonly projected through said branches and the other of said extensions, and supporting means for said strap secured to the basal portion of said channel.

6. In a mounting bracket of the character described, a clamping strap having laterally spaced end sections, said end sections being respectively arranged to either side of a plane common to the central axis of the clamping strap, a bolt extending substantially normal to said plane and projected through said end sections for clamping said strap about a body to be supported, one of said end sections being in the form of a channel the mouth of which presents inwardly and toward the body of said strap, the side walls of said channel being substantially parallel and inflexible whereby to provide a rigid two-point support for said bolt and the base wall thereof being securable flatwise against a support for the bracket, said base wall being substantially flat throughout its entire extent.

In testimony whereof, I have hereunto affixed my signature.

JOHN R. McFARLIN.